C. F. MOELLER.
SPRING WHEEL.
APPLICATION FILED AUG. 21, 1916.
1,235,586.
Patented Aug. 7, 1917.
2 SHEETS—SHEET 1.
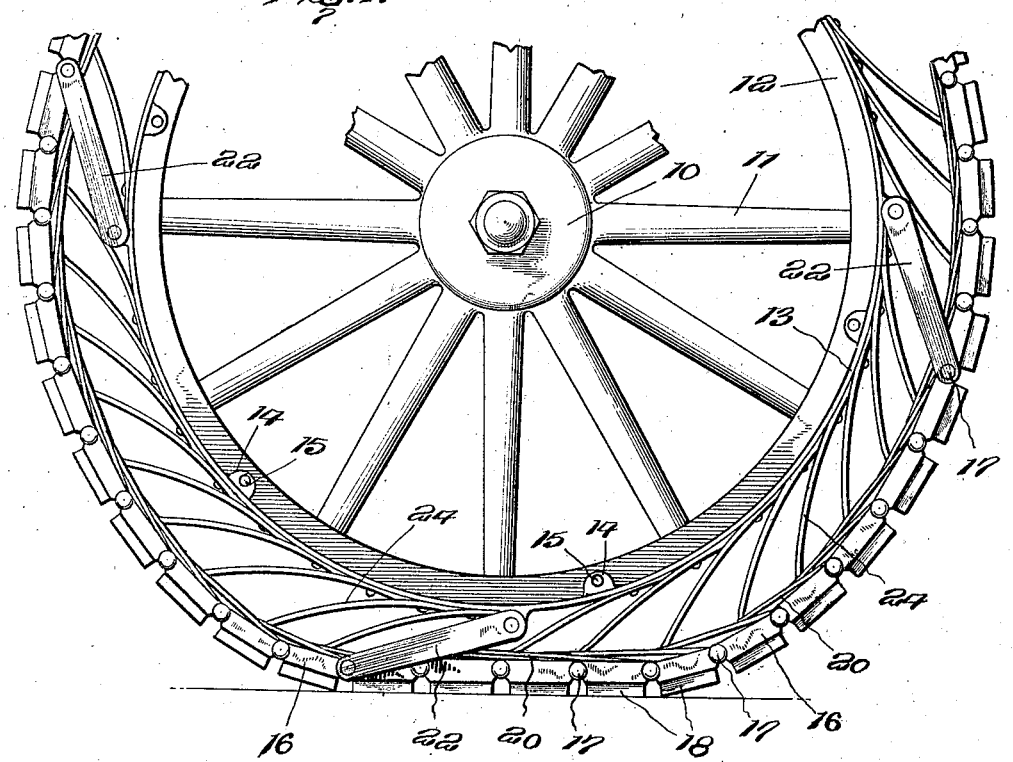
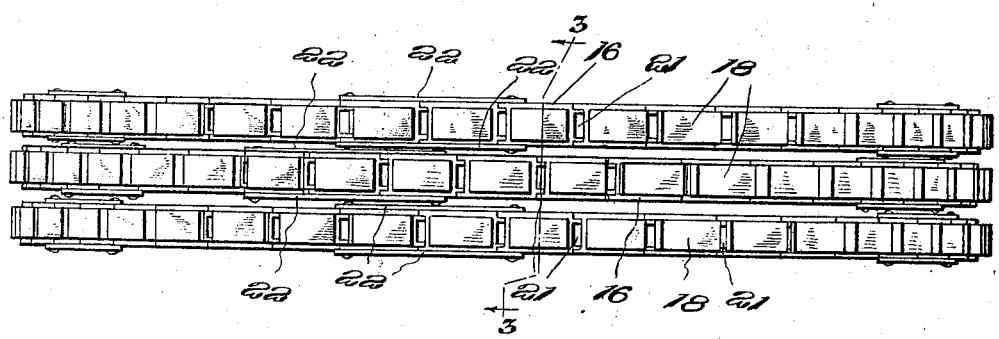
Inventor
C. F. Moeller
By
Attorneys C. F. MOELLER.
SPRING WHEEL.
APPLICATION FILED AUG. 21, 1916.
1,235,586.
Patented Aug. 7, 1917.
2 SHEETS—SHEET 2.
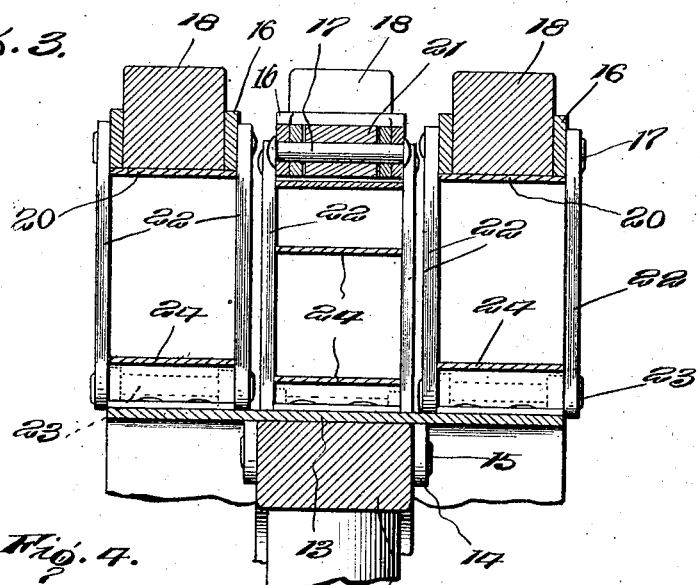
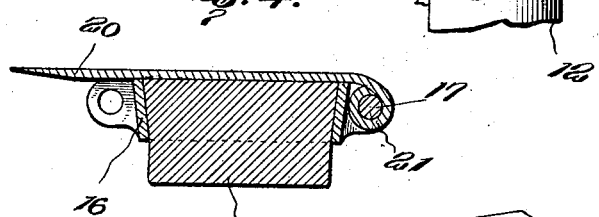
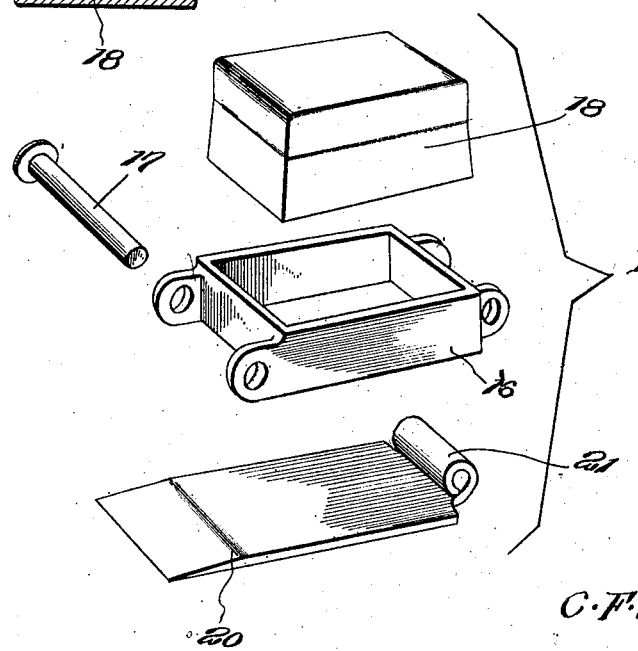
Inventor
C. F. Moeller.
By
[signature], Attorneys

UNITED STATES PATENT OFFICE.

CHARLES F. MOELLER, OF NEW ORLEANS, LOUISIANA.

SPRING-WHEEL.

1,235,586.   Specification of Letters Patent.   Patented Aug. 7, 1917.

Application filed August 21, 1916. Serial No. 116,124.

*To all whom it may concern:*

Be it known that I, CHARLES F. MOELLER, a citizen of the United States, residing at New Orleans, in the parish of Orleans and State of Louisiana, have invented certain new and useful Improvements in Spring-Wheels, of which the following is a specification.

This invention relates to an improved spring wheel and has as its primary object to provide a construction designed to displace the use of the commonly employed pneumatic tire.

The invention has as a further object to provide an arrangement wherein the wheel will be effectually cushioned under eccentric movement of the hub while, at the same time, the structure will be thoroughly durable.

And the invention has as a still further object to provide a wheel employing a tread formed of a plurality of annular sections independently cushioned and free with respect to each other so that the said tread will effectually engage the road surface to secure a purchase thereon and further so that the cushioning action of the wheel will be correspondingly enhanced.

Other and incidental objects will appear as the description proceeds and in the drawings wherein I have illustrated the preferred embodiment of the invention and wherein similar reference characters designate corresponding parts throughout the several views:

Figure 1 is a fragmentary side elevation of my improved wheel showing the manner in which the tread thereof is yieldably supported to cushion the wheel, Fig. 2 is a plan view showing the arrangement of the tread blocks upon the sections of the wheel tread, Fig. 3 is a transverse sectional view taken on the line 3—3 of Fig. 2 and more particularly showing the connection between the sections of the tread and the inner rim of the wheel, Fig. 4 is a detail sectional view showing one of the tread units and illustrating the mounting of the tread blocks employed, and Fig. 5 is a detail perspective view showing the elements of one of the tread units disconnected but in proper operative position with respect to each other.

In carrying out the invention, the wheel is formed with a hub 10 from which radiates a plurality of spokes 11 surrounded at their outer extremities by a felly 12. Mounted upon the felly is an inner rim 13 which, as particularly shown in Fig. 3 of the drawings, overhangs the felly at opposite sides thereof. Extending inwardly from the rim 13, are pairs of oppositely disposed ears 14 confronting opposite sides of the felly and receiving bolts or other suitable fastening devices 15 connecting the rim with the felly.

Surrounding the inner rim 13 is a tread which, as particularly shown in Fig. 2, is formed of a plurality of annular sections. These sections are all of similar construction and each includes a series of tread links 16 which are each provided at opposite ends thereof with spaced ears, as particularly shown in Fig. 5 of the drawings with the ears of the said links interfitting and connected by a plurality of pivot pins 17. The links 16 are preferably of rectangular configuration and are open to receive tread blocks 18. These blocks may be formed of wood or other similar resilient material and are fitted into the links 16 to wedge therein, the blocks being slightly larger at their inner extremities than at their outer extremities. Arranged to overlie the inner ends of the tread blocks are a plurality of bearing plates 20. These plates are, at their inner extremities, rolled to form hinge loops 21 freely receiving the pivot pins 17 for pivotally supporting the plates upon the pins beneath the tread links 16 with the beveled free ends of the plates overlapping to provide an annular section of a flexible outer rim arranged to coöperate with the said links. The tread sections as thus formed are arranged side by side, as best shown in Fig. 3, around the inner rim 13 with the tread blocks 18 of the intermediate tread section disposed in staggered relation to the tread blocks of the outermost tread sections. Connecting the tread sections with the rim 13, are a plurality of links 22. These links are arranged in pairs at quadrantly spaced points about the rim sections to engage opposite side edges of the sections with the inner ends of the links swingingly connected to the inner rim by suitable pivot pins 23 and with the outer ends of the said links freely engaging adjacent pivot pins 17 of the rim sections, the said pivot pins 17 being elongated, of course, to receive the said links. Preferably, the inner rim 13 is provided with suitable upstanding ears to receive the pivot pins 23, but, as will be understood, the said pivot pins may be connected with the said rim in any suitable manner.

Bearing between the inner rim 13 and the plates 20 of the rim sections are a plurality of cushioning elements or springs 24. These springs are suitably connected at their inner extremities with the inner rim with the outer ends of the springs freely engaging the said bearing plates and are arranged in laterally spaced annular series upon the inner rim with one series of springs arranged to coöperate with each of the tread sections. As will now be clear, eccentric movement of the hub 10 will, as particularly shown in Fig. 1 of the drawings, be yieldably cushioned by the springs 24 with the rim sections adapted to flex under the weight of a load to conform to the road surface, and since the said rim is formed of sections independent with respect to each other, the said sections will be adapted to individually act for cushioning the wheel. Moreover, in employing a plurality of tread sections, a secure purchase for the wheel will be held. It will thus be seen that I provide a very efficient construction for the purpose set forth and a wheel which may be used to displace the commonly employed pneumatic tire.

Having thus described the invention, what I claim and desire to secure by Letters Patent is:

1. A spring wheel including an inner rim, an annular tread surrounding the said rim and including a plurality of pivotally connected links, bearing plates connected to said links and coacting to provide an outer rim, and a plurality of cushioning elements between the inner and outer rims.

2. A spring wheel including an inner rim, an annular tread surrounding the said rim and formed of a plurality of units pivotally connected, bearing plates mounted to swing upon the said units and coacting to provide an outer rim, and a plurality of cushioning elements for the tread bearing between the said rims.

3. A spring wheel including an inner rim, an annular tread surrounding the said rim, the said tread including a plurality of pivotally connected links, tread blocks carried by said links, and bearing plates pivotally connected with the said links and coacting therewith with the said plates overlapping to provide an outer rim, and cushioning elements for the tread bearing between said inner and outer rims.

4. A spring wheel including an inner rim, an annular tread surrounding the said rim, the said tread including a plurality of links, means pivotally connecting the said links, and a plurality of bearing plates pivotally mounted upon the said means and coacting to provide an outer rim, a plurality of cushioning elements for the tread bearing between the inner and outer rims, and means connecting the tread with the inner rim and secured to the said first mentioned means.

5. A spring wheel including an inner rim, an annular tread surrounding the said rim, the said tread including a plurality of pivotally connected links, tread blocks fitted through the said links, and bearing plates connected with the links to overlie the inner ends of said blocks with the said plates coacting to provide an outer rim, and cushioning elements for the tread bearing between the said inner and outer rims.

6. A spring wheel including an inner rim, an annular tread surrounding the said rim, the said tread including a plurality of links provided with pivotally connected mating ears, and bearing plates fitting between the said ears and connected with the said links with the said plates coacting to provide an outer rim, and cushioning elements for the tread bearing between said inner and outer rims.

In testimony whereof I affix my signature.

CHARLES F. MOELLER. [L. S.]

Copies of this patent may be obtained for five cents each, by addressing the "Commissioner of Patents. Washington, D. C."